United States Patent [19]

Hoshikawa et al.

[11] Patent Number: 4,693,738
[45] Date of Patent: Sep. 15, 1987

[54] METHOD FOR PRODUCING GLASS PREFORM FOR OPTICAL FIBER

[75] Inventors: Masao Hoshikawa; Michihisa Kyoto; Koji Yano; Gotaro Tanaka, all of Yokohama, Japan

[73] Assignee: Sumitomo Electric Industries, Ltd., Osaka, Japan

[21] Appl. No.: 781,636

[22] Filed: Sep. 30, 1985

[30] Foreign Application Priority Data

Oct. 5, 1984 [JP] Japan .................. 59-208032

[51] Int. Cl.$^4$ .......................................... C03B 37/014
[52] U.S. Cl. .................................. 65/3.11; 65/3.12; 65/18.2; 65/DIG. 16
[58] Field of Search .................. 65/3.11, 3.12, 3.14, 65/18.2, DIG. 16

[56] References Cited

U.S. PATENT DOCUMENTS

| | | | |
|---|---|---|---|
| 4,157,906 | 6/1979 | Bailey | 65/3.12 |
| 4,165,223 | 8/1979 | Powers | 65/18.2 X |
| 4,263,031 | 4/1981 | Schultz | 65/18.2 X |

FOREIGN PATENT DOCUMENTS 56-50136  5/1981  Japan ..................... 65/DIG. 16

Primary Examiner—Kenneth M. Schor
Attorney, Agent, or Firm—Cushman, Darby & Cushman

[57] ABSTRACT

An optical fiber comprising a core essentially made of quartz and a cladding made of fluorine added quartz is fabricated with good productivity from a glass preform produced by a method comprising maintaining a hollow cylindrical porous glass preform in a first high temperature atmosphere comprising at least one fluorine-containing compound with jetting a cooling gas through the central hollow part of the porous glass preform to grade the amount of fluorine to be added in the radial direction of the porous glass preform and then sintering the porous glass preform in a second high temperature atmosphere kept at a temperature higher than the first high temperature atmosphere to make it transparent.

6 Claims, 5 Drawing Figures

METHOD FOR PRODUCING GLASS PREFORM FOR OPTICAL FIBER

FIELD OF THE INVENTION

The present invention relates to a method for producing a glass preform for use in fabrication of an optical fiber. More particularly, it relates to a method for producing a glass preform for use in fabrication of an optical fiber which comprises a core essentially made of quartz glass and a cladding made of fluorine added quartz glass and has low attenuation of light transmission.

BACKGROUND OF THE INVENTION

An optical fiber comprises a core and a cladding which surrounds the core and has a lower refractive index than that of the core.

Several methods for producing the optical fiber have been developed and are commercially employed. Examples of such methods are the modified chemical vapor deposition method (M-CVD method), the vapor axial deposition method (VAD method) and the outside vapor deposition method (OVD method). In these methods, the core is mainly made of $SiO_2/GeO_2$ type glass, and the cladding is mainly made of $SiO_2$.

Since light is intensively propagated through the core of the optical fiber, from an idealistic viewpoint, the core is to be made of $SiO_2$ which has the smallest attenuation of light transmission. On the other hand, the cladding made of $SiO_2$ containing an additive such as $B_2O_3$ and fluorine for reducing the refractive index since it should have a lower refractive index than that of the core. Although $B_2O_3$ may be added to the core of the optical fiber employed in some uses, it is not preferred to add $B_2O_3$ to the core of the optical fiber through which light having a wavelength longer than 1 $\mu$m is propagated since the presence of B-O bonds absorb light in far infrared range. In this respect, fluorine is an ideal additive for the cladding since it does not induce any absorption peak in a wavelength range used for the optical fiber. Thus, it is preferable to adjust the refractive index difference between the core and the cladding of the optical fiber by making use of $SiO_2$ as the core material and $SiO_2/F$ type glass as the cladding material. Such an optical fiber is disclosed in Japanese Patent Publication No. 15682/1980.

The optical fiber comprising the core made of $SiO_2$ and the cladding made of $SiO_2/F$ type glass is fabricated from a glass preform produced, for example, by accumulating fluorine added quartz glass in a glassy state around a quartz rod in its radial direction by means of thermal plasma, or by depositing fine particles of fluorine added quartz glass around a quartz rod in its radial direction by flame hydrolysis of the glass raw material and sintering the deposited fine particle mass to make it transparent, or by depositing fluorine added quartz glass on an inner surface of a quartz tube by the M-CVD method to form a core portion and collapsing the central hollow part to form a glass preform in a solid rod form.

However, by the thermal plasma method, it is difficult to fabricate an optical fiber having satisfactorily low attenuation of light transmission from the produced glass preform, since an interface between the quartz rod and the accumulated fluorine added quartz glass is polluted and the fluorine added glass itself is contaminated with hydroxyl groups. By the method in which the fine glass particles are deposited around the quartz rod by flame hydrolysis, it is also difficult to fabricate an optical fiber having satisfactorily low attenuation of light transmission from the produced glass preform, since the quartz rod is contaminated with the hydroxyl groups made from water adsorbed on the surface of the quartz rod or produced by the flame hydrolysis of the glass raw material. In this method, water or moisture is easily removed from the fine glass particles but hardly removed from the inside of the quartz rod. Although the M-CVD method can produce the glass preform from which an optical fiber having comparatively good properties, it is poor in productivity.

SUMMARY OF THE INVENTION

One object of the present invention is to provide an improved method for producing a glass preform for an optical fiber comprising a core essentially made of quartz glass and a cladding made of fluorine added quartz glass with high productivity.

Another object of the present invention is to provide a method for producing a glass preform by which the amount of fluorine to be added to the quartz glass of the cladding is easily graded, and the contamination of the hydroxyl groups is prevented.

According to the present invention, there is provided a method for producing a glass preform for an optical fiber comprising maintaining a hollow cylindrical porous glass preform in a first high temperature atmosphere comprising at least one fluorine-containing compound with jetting a cooling gas through the central hollow part of the porous glass preform to grade the amount of fluorine to be added in the radial direction of the porous glass preform and then sintering the porous glass preform in a second high temperature atmosphere kept at a temperature higher than the first high temperature atmosphere to make it transparent.

DETAILED DESCRIPTION OF THE INVENTION

As a result of the extensive study, the followings have been found:

When fluorine is added to the quartz glass, the refractive index n of the quartz glass is lowered. A lowering degree $|\Delta n|$ of the refractive index as compared to the refractive index of pure quartz is given by the following equation:

$$|\Delta n| = 4.71 \times 10^3 \times P_{SF_6} \times \exp(-25.6 \times 10^3/RT) \quad (I)$$

wherein $P_{SF_6}$ is a partial pressure of $SF_6$ when $SF_6$ is used as the fluorine-containing compound, R is the Boltzmann's constant (1.987 cal/deg.mol) and T is an absolute temperature (K) of the atmosphere.

According to the equation (I), it is understood that the lowering degree of the refractive index is greatly influenced by the ambient temperature and proportional to the fourth root of the partial pressure of the fluorine-containing compound.

Figure 1:
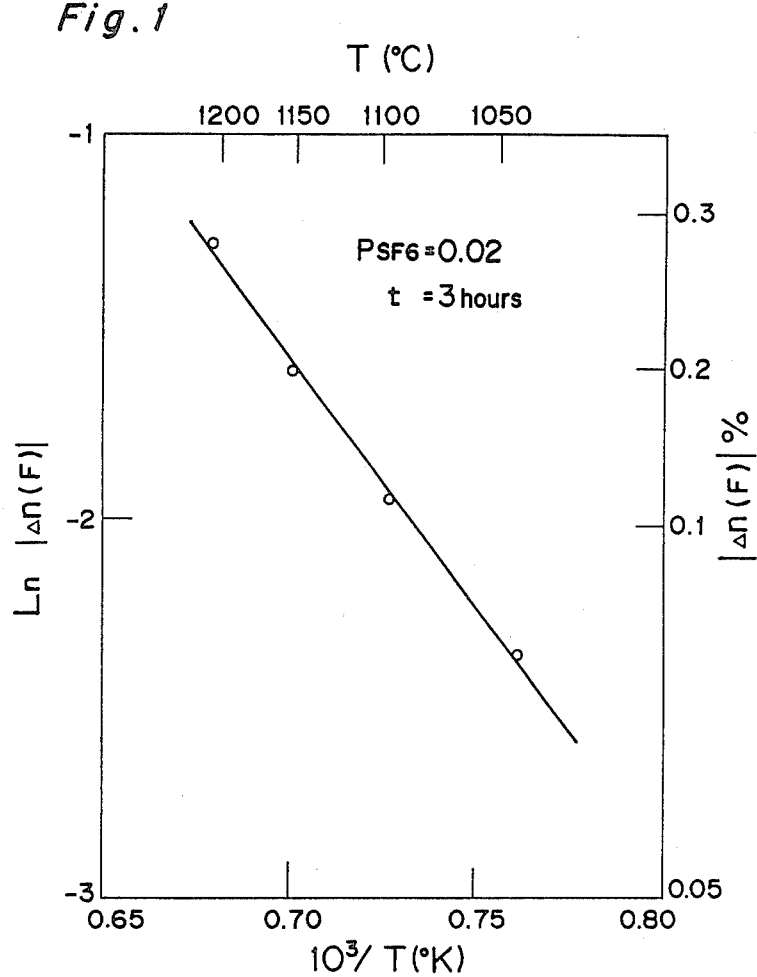
FIG. 1 shows a relationship between the ambient temperature and the lowering degree of the refractive index of fluorine added quartz glass, FIG. 2 schematically shows one embodiment of the method for producing a glass preform according to the present invention, FIG. 3 schematically shows another embodiment of the method for producing a glass preform according to the present invention.

FIG. 1 shows a relationship between the ambient temperature and the lowering degree of the refractive index of various fluorine added quartz glasses which is produced by maintaining quartz fine particle mass made by the flame hydrolysis in an atmosphere containing $SF_6$ with a partial pressure of 0.02 atm for three hours at various temperature and heating the mass in a pure helium atmosphere at 1,650° C. to make it transparent.

In the above treatment of the quartz fine particle mass, the addition of fluorine is a reversible reaction expressed by the following reaction equation:

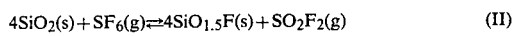

$$4SiO_2(s) + SF_6(g) \rightleftharpoons 4SiO_{1.5}F(s) + SO_2F_2(g) \qquad (II)$$

wherein (s) and (g) stand for solid and gaseous states, respectively.

The degree of the reaction progress towards the right side of the equation (II) depends on the equation (I) since the produced amount of $SiO_{1.5}F$ corresponds to the added amount of fluorine which is determined by the equation (I). This means that the reaction progress of the equation (II) substantially depends on the atmospheric temperature.

In the method of the present invention, the added amount of fluorine is adjusted by controlling the ambient temperature and the partial pressure of the fluorine—containing compound according to the above finding.

Now, the method for producing the glass preform according to the present invention will be illustrated by way of example with reference to the accompanying drawings.

Figure 2:
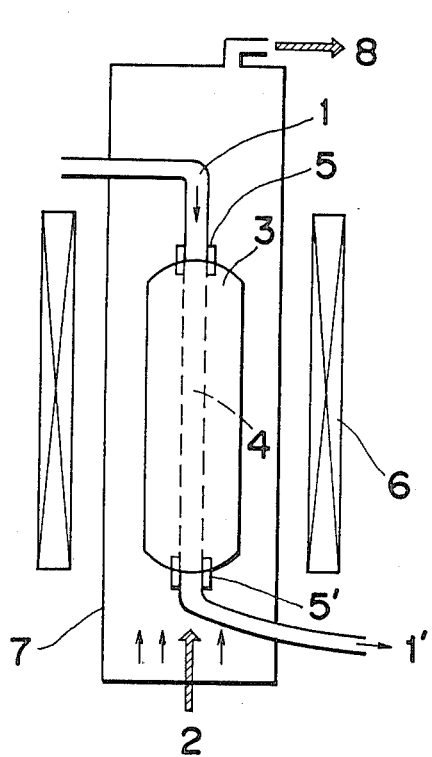

Around an elongate starting rod in its radial direction, there are deposited quartz fine particles produced by flame hydrolysis or thermal oxidative decomposition of a glass raw material such as $SiCl_4$ according to a per se conventional method to form a porous glass preform with a predetermined radius and length. Then, the starting rod is removed from the porous glass preform. Thereafter, as shown in FIG. 2, inlet and outlet tubes 5,5' made of a suitable material such as quartz or alumina are attached to each end of a central bore 4 of the porous glass preform 3. The inlet and outlet tubes may be attached to the starting rod before the fine glass particles are deposited around the rod. The porous glass preform 3 with the tubes 5,5' is inserted in a furnace comprising a heater 6 and a muffle 7 filled with an atmospheric gas comprising the fluorine-containing compound. In FIG. 2, the atmospheric gas is introduced from an inlet 2 and exhausted from an outlet 8. Simultaneously, a cooling gas 1 such as helium or nitrogen is jetted in the central bore 4 through the inlet tube 5 and exhausted from an outlet 1. By flowing the atmospheric gas comprising the fluorine-containing compound around the outer surface of the porous preform and simultaneously jetting the cooling gas 1 in the central bore 4, temperature gradient is formed in the radial direction of the porous preform 3.

Figure 3:
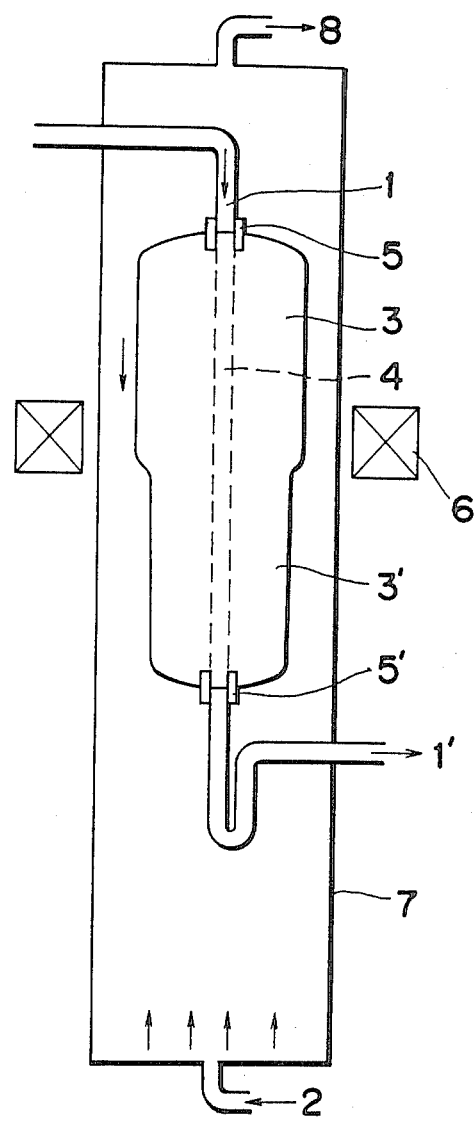

The outer periphery of the porous glass preform 3 is heated at a temperature of 900° to 1,400° C., particularly around 1,200° C. in the atmosphere comprising the fluorine-containing compound while the cooling gas is jetted in the central bore 4. Therefore, the partial pressure of the fluorine-containing compound also has gradient so that it increases towards the outer periphery of the preform 3. As the result, the added amount of fluorine can be reduced near the central bore 4. By sintering the thus fluorine added porous glass preform at a temperature higher than that in the fluorine adding step by at least 1,650° C., a transparent glass preform having higher refractive index near the central part and lower refractive index near the outer periphery of the preform can be produced FIG. 3 schematically shows another embodiment of the method according to the present invention. In FIG. 3, the same numerals stand for the same elements as in FIG. 2. In this embodiment, the heater 6 is kept at a higher temperature than that in FIG. 2 and the furnace is longer than that of FIG. 2. While the porous glass preform is kept stationary in the furnace in FIG. 2, it gradually descends in the direction of an arrow in FIG. 3. Although the porous glass preform slightly shrinks during descending, the central bore 4 is not collapsed and at least a part of the preform still remains in the fine particle state. In the descending step, the atmospheric gas comprising the fluorine-containing compound is introduced in the furnace and the cooling gas is jetted in the central bore in the same manners as described in the above.

As the porous glass preform, pure quartz glass preform is preferred although any other fine glass particle mass through which the atmospheric gas can diffuses may be used. Examples of the other porous glass preform are those made of pure germania or quartz glass containing other glass such as germania.

The cooling gas preferably comprises an inert or inactive gas such as helium and nitrogen.

When the porous glass preform is produced by the flame hydrolysis of the glass raw material, it contains a great number of the hydroxyl groups. Thus, the atmospheric gas and/or the cooling gas preferably contains halogen such as chlorine as a dehydrating agent.

The fluorine-containing compound may be any one that is in the gaseous state at a high temperature. Specific examples of the fluorine-containing compound are $SF_6$, $CF_4$, $C_2F_4$, $SiF_4$ and the like or their mixtures. The fluorine-containing compound as such may be used as the atmospheric gas or diluted with an inert gas such as helium and nitrogen.

The sintering of the porous preform may be carried by a per se conventional method in an atmosphere of an inert gas such as helium and nitrogen.

The present invention will be hereinafter explained in detail by following examples.

EXAMPLE 1

Around an outer periphery of an alumina rod with a diameter of 10 mm, fine particles of pure quartz glass produced by the flame hydrolysis were deposited in the radial direction of the alumina rod to form a porous glass mass and then the alumina rod was removed to obtain a hollow cylindrical porous glass preform with an outer diameter of 60 mm and length of 500 mm.

The porous glass preform was inserted in the furnace of FIG. 2 kept at 800° C. with flowing in the muffle 7 a gaseous mixture of $SF_6$, helium and chlorine (volume ratio of 0.02:0.95:0.03) as the atmospheric gas at a rate of 1 l/min. and jetting in the hollow part of the porous preform a gaseous mixture of helium and chlorine (volume ratio of 0.03:0.97) as the cooling gas in the hollow part of the preform at a rate of 20 l/min. Under these conditions, the temperature was raised to 1,200° C. and kept at the same temperature for 2 hours. Thereafter, pure helium was flowed as the atmospheric gas at the same rate in the muffle and jetted as the cooling gas at a rate of 0.05 l/min. in the hollow part of the porous preform. Under these conditions, the temperature was raised to 1,650° C. and kept at the same temperature for 3 hours to make the preform transparent.

Figure 4:
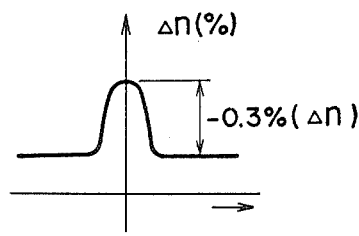
FIGS. 4 and 5 show distributions of refractive index of the optical fibers produced in Examples 1 and 2, respectively.

After collapsing the hollow part of the transparent glass preform, an optical fiber comprising a core with a diameter of about 10 μm and a cladding with an outer diameter of 125 μm was fabricated from the glass preform by a per se conventional method. The refractive index of the core is 0.3% larger than that of the cladding. A distribution of the refractive index in the radial direction of the optical fiber is shown in FIG. 4. The attenuation of light transmission of the optical fiber at a wavelength of 1.3 μm was 0.35 dB/km.

EXAMPLE 2

In the same manner as in Example 1 but using an alumina rod with a diameter of 20 mm, a hollow cylindrical porous glass preform with an outer diameter of 50 mm and length of 600 mm was produced.

The porous glass preform was inserted from its lower end in the furnace of FIG. 3 kept at 1,350° C. at a lowering rate of 4 mm/min. with flowing in the muffle pure $SiF_4$ as the atmospheric gas at a rate of 1 l/min and jetting in the hollow part of the porous preform a gaseous mixture of helium and chlorine (volume ratio of 95:5) as the cooling gas at a rate of 40 l/min. After the whole porous glass preform passed the high temperature zone of the furnace, pure helium was flowed as the atmospheric gas at the same rate and jetted as the cooling gas at a rate of 0.1 l/min. Under these conditions, the temperature was raised to 1,600° C. and at the same temperature, the glass preform was pulled up at a rate of 3 mm/min. to make it transparent.

Figure 5:
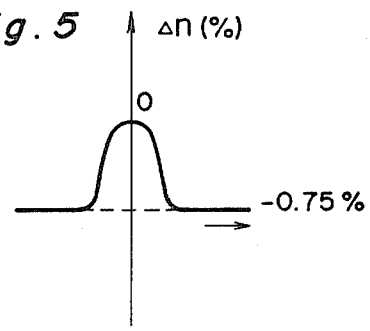

After collapsing the hollow part of the transparent glass preform, an optical fiber comprising a core with a diameter of 50 μm and a cladding with an outer diameter of 125 μm was fabricated from the glass preform by a per se conventional method. The refractive index of the core is 0.75% larger than that of the cladding. A distribution of the refractive index in the radial direction of the optical fiber is shown in FIG. 5. The attenuation of light transmission of the optical fiber at a wavelength of 1.3 μm was 0.65 dB/km.

COMPARATIVE EXAMPLE 1

Around a synthetic quartz rod containing 10 ppb of residual hydroxyl groups with a diameter of 10 mm, quarts glass added with fluorine in an amount corresponding to refractive index difference of −0.3% was deposited and simultaneously made transparent by the thermal plasma method. From the produced glass preform, an optical fiber hading the same size as that produced in Example 1 was fabricated.

Attenuation of light transmission of the optical fiber at a wavelength of 1.30 μm was 8 dB/km, which corresponded to the residual hydroxyl group of 4 ppm.

COMPARATIVE EXAMPLE 2

Around the same quartz rod as used in Comparative Example 1, pure quartz fine particles were deposited by the VAD method and heated at 1,200° C. in a gaseous mixture of $SF_6$ (200 ml/min.) and helium (10 l/min.) for 3 hours. After terminating the supply of $SF_6$, the temperature was raised to 1,650° C. to make the preform transparent. From the transparent glass preform, an optical fiber having the same structure as that fabricated in Example 1 was fabricated but contained 5 ppm of the residual hydroxyl groups originated from water diffused in the quartz rod during deposition of the glass particles by the VAD method.

What is claimed is:

1. A method for producing a glass preform for an optical fiber comprising the steps of:
   maintaining, for a sufficient contact time, a hollow cylindrical porous glass preform in a first high temperature atmosphere comprising at least one gaseous fluorine-containing compound while jetting a cooling gas through the central hollow part of the porous glass preform to grade an amount of fluorine thereby added in the radial direction of the porous glass preform, said amount of fluorine added to the porous glass preform being added in sufficient quantity and under proper operating conditions to modify the refractive index of said porous glass preform, and said cooling jet being sufficient to provide for the establishment of a gradient of partial pressure of the fluorine-containing compound which increases toward the outer periphery of the porous glass preform, and then
   sintering the porous glass preform in a second high temperature atmosphere kept at a temperature higher than the first high temperature atmosphere to make the preform transparent.

2. A method according to claim 1, wherein the porous preform is a fine glass particle mass produced by flame hydrolysis.

3. A method according to claim 2, wherein the fine glass particle mass is made of pure quartz glass particles.

4. A method according to claim 1, wherein the cooling gas comprises helium.

5. A method according to claim 1, wherein the first high temperature atmosphere comprises chlorine.

6. A method according to claim 1 wherein the fluorine-containing compound is at least one selected from the group consisting of $SF_6$, $CF_4$, $C_2F_6$ and $SiF_4$.

* * * * *